UNITED STATES PATENT OFFICE.

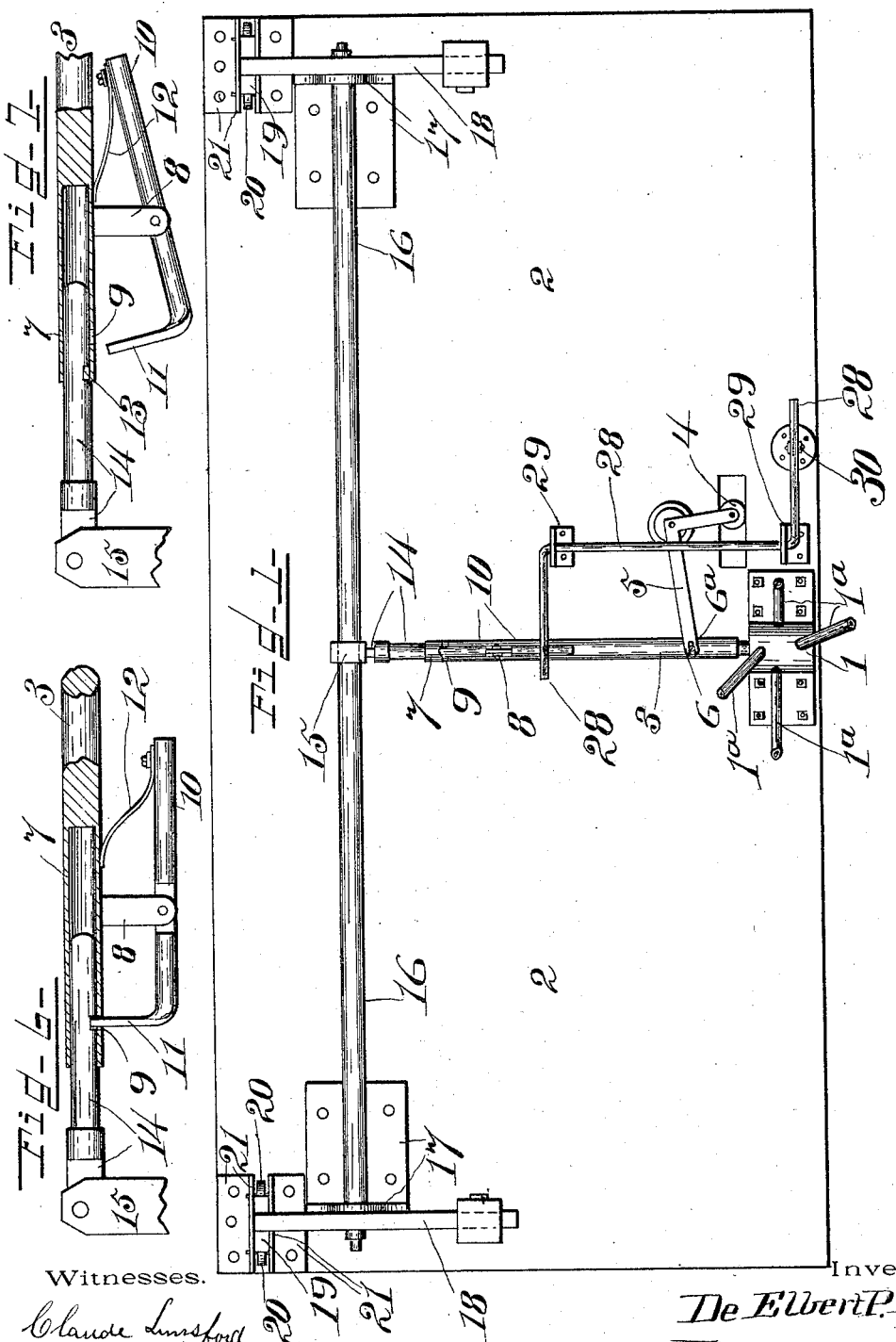

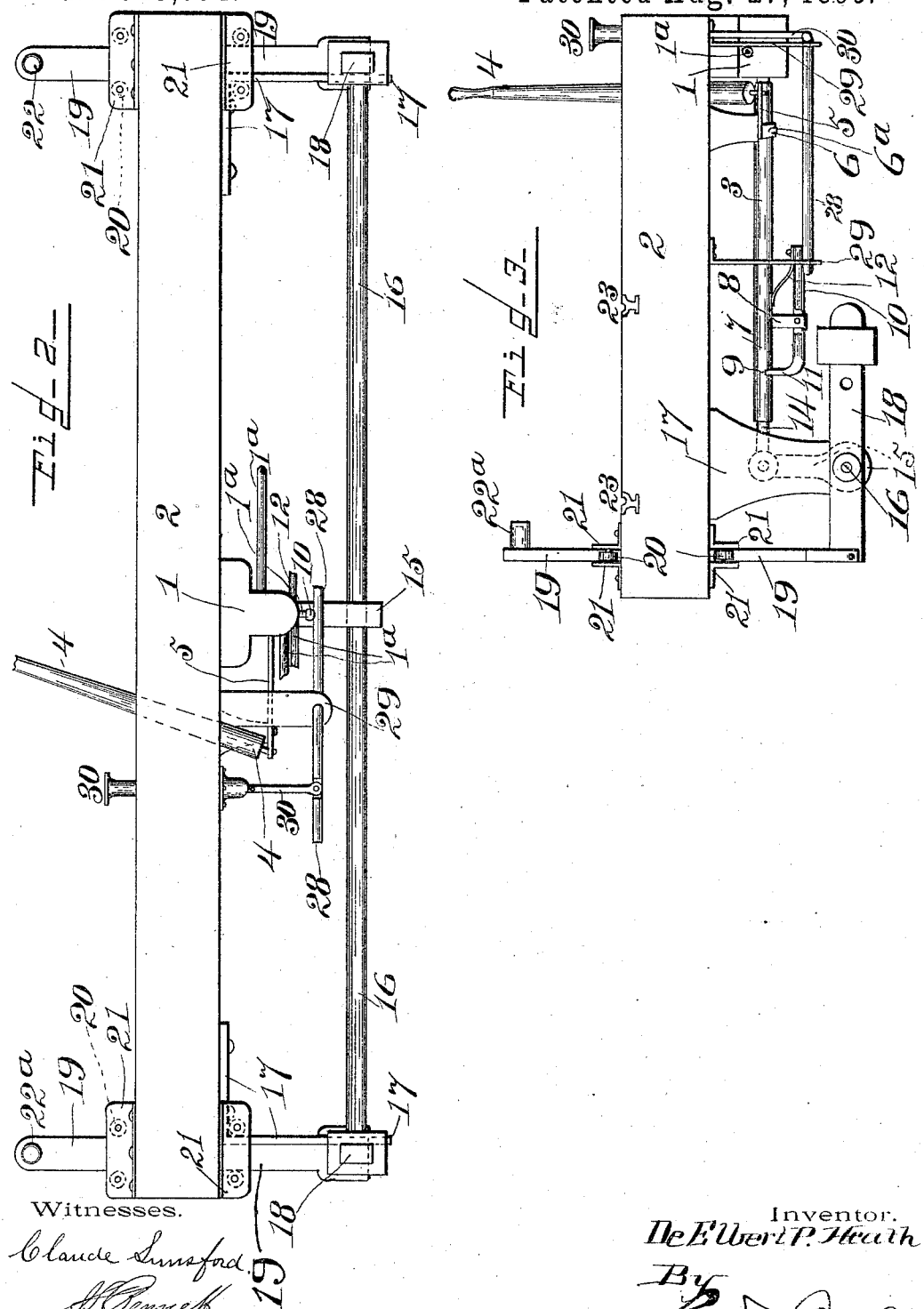

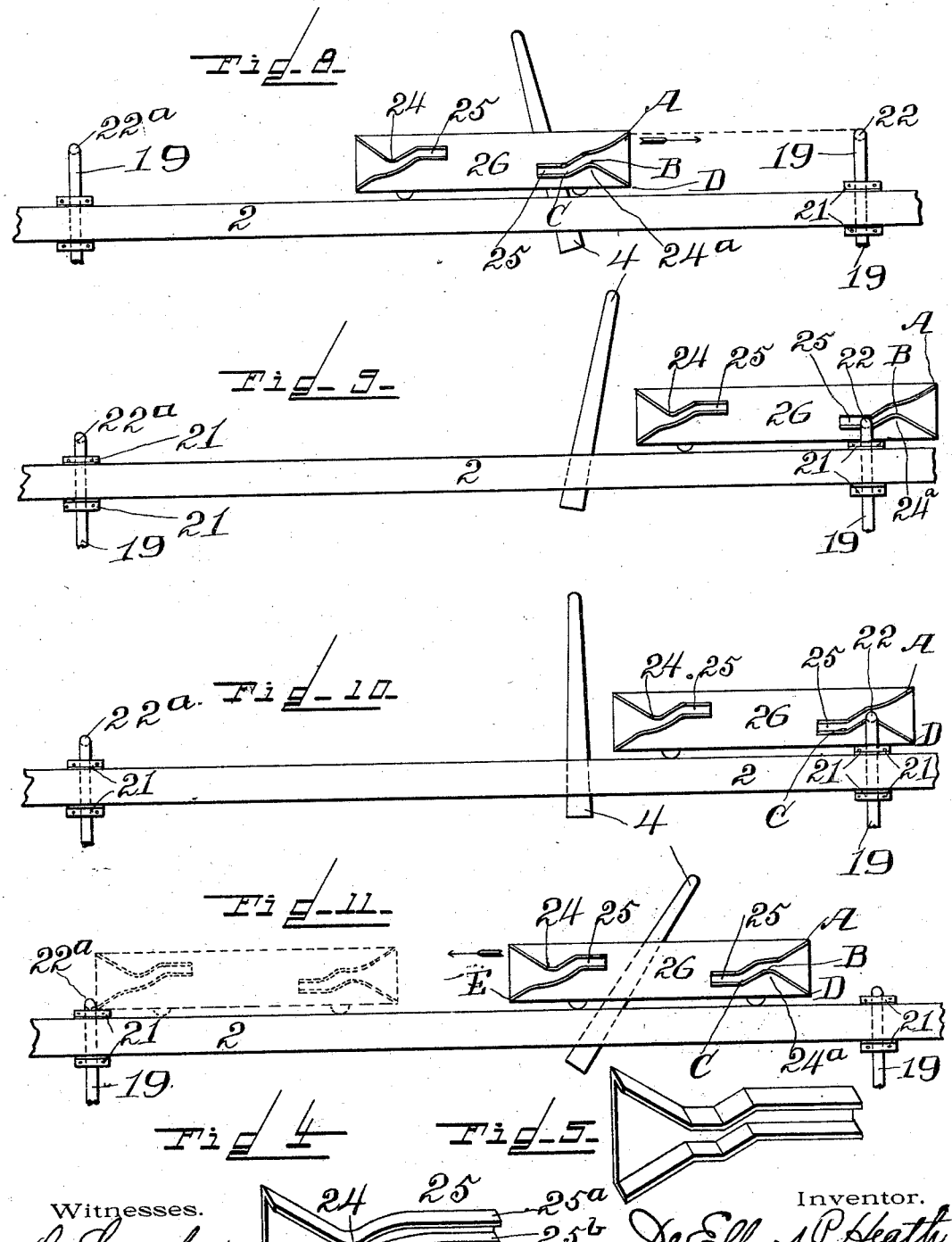

DE ELBERT PARMENTER HEATH, OF TOMAHAWK, WISCONSIN.

AUTOMATIC REVERSER AND SAFETY-CHECK FOR MILL-CARRIAGES.

SPECIFICATION forming part of Letters Patent No. 545,074, dated August 27, 1895.

Application filed June 1, 1894. Serial No. 513,144. (No model.)

*To all whom it may concern:*

Be it known that I, DE ELBERT PARMENTER HEATH, a citizen of the United States, residing at the city of Tomahawk, in the county of Lincoln, State of Wisconsin, have invented a new and useful machine known and designated as an Automatic Reverser and Safety-Check for Mill-Carriages, of which the following is a specification.

This invention relates to sawmill-carriages, and particularly to an automatic reverser and safety-catch for such carriages; and the object of the invention is to provide means for preventing carriages from going beyond the control of the operator.

A further object of the invention is to provide a reverser for log-sawing-mill carriages of novel and simple construction, which shall work automatically.

A still further object of the invention is to provide a safety check or stop mechanism of new and novel construction, which shall be positive and certain in its controlling action of a carriage.

Other objects and advantages peculiar to the machine and accruing from its construction and operation will be revealed in the specification and claims to follow.

In the accompanying drawings, forming part of this application, Figure 1 is a bottom plan view of the complete mechanism attached in position upon the under side of a track-floor. Fig. 2 is a side elevation of Fig. 1. Fig. 3 is an end view of Fig. 1. Fig. 4 is a perspective view of the reverser. Fig. 5 is a similar view of a modification. Fig. 6 is an enlarged detached sectional view of the valve-stem coupled. Fig. 7 is a similar view uncoupled. Fig. 8 is a side elevation with the underlying mechanism broken away, showing the carriage moving toward the right in the direction indicated by the arrow and the right roller in position to be engaged by the point A of the cam and close steam-valve. Fig. 9 is a similar view showing the position of the roller to open the valve and put steam behind or to the right of the carriage. Fig. 10 is a similar view showing the roller engaging the cam to close steam-valve and stop the carriage from moving in either direction. Fig. 11 is a similar view showing the roller moved down from the cam by the hand-lever, which opens wide the steam-valve and puts steam-pressure behind or to the right of the carriage and forces it over to the left roller, as indicated by the arrow, with the left cam shown in dotted lines engaging the left roller.

The same numerals and letters of reference denote the same parts throughout the several figures of the drawings.

The valve 1, which may be of any well-known slide-valve type and connected by pipes $1^a$ to an ordinary steam source, is firmly secured to the under side of the track-floor 2, and is provided with a valve-stem 3, hereinafter more fully described, having a hand-lever 4 connected thereto by a bell-crank lever 5, said hand-lever extending through the floor in convenient reach of the operator. The connection between the bell-crank lever 5 and valve-stem is made by means of the forked end 6 of the lever 5 engaging pivot $6^a$ on the valve-stem.

The free end of the valve-stem 3 is provided with a sleeve 7, made rigid therewith, having a post 8 and a slot 9, in which post is pivoted the trigger 10, having a projection 11, held in the said slot 9 by means of the spring 12. This projection 11 also engages a notch or groove 13 in the connecting-rod 14 when so held by the spring, the free end of said rod being free to slide in the said sleeve when uncoupled, thus coupling the said rod and valve-stem together, the means for throwing the trigger and uncoupling these parts and purpose thereof to be presently described.

The end of the rod 14, which projects out of the sleeve 7, is connected to a crank 15 upon the rock-shaft 16, the ends of the latter being journaled parallel with the travel of the carriage in bearing-brackets 17, secured to the floor 2 and provided with weighted levers 18. Each of the levers 18 has pivoted thereto a vertically-moving rod or bar 19, the free end of which passes through the floor and between guide-rollers 20, secured between the brackets 21, and one of said bars is provided with rollers 22 and the other bar with a like roller $22^a$, adjacent the track 23.

It is to be understood that the rock-shaft 16, rod or bar 19, levers 18, and crank comprise the carriage-reversing mechanism.

The reverser 25 consists of a metallic track having top and bottom flanges $25^a$ and $25^b$, and is secured to one side of the carriage. The top flange 25ª has a cam 24 near its end, and the bottom flange 25ᵇ has a like cam 24ª, also near its end and at the opposite end of the track having the cam 24. These cams are formed by deflecting the flanges inwardly beyond the central line of the track, and the tracks are secured upon the carriage 26 with the cams nearest the end of the carriage, and the flanges of one track are deflected upward from the mouth of its cam, while the flanges of the other track are deflected downward from the mouth of its cam.

The mechanism for throwing the trigger 10 and uncoupling the valve-stem from the connecting-rod consists of a crank-shaft 28, journaled in hangers 29, secured to the floor 2, one end of which engages the trigger, and to the other end is connected a foot-lever 30, extending upward through the floor 2. When it is not desired that the reversing mechanism be employed, it may be dispensed with by the operator simply pressing down the foot-lever 30, which operates the crank-shaft 28 and raises the projection of the trigger out of the connecting-rod notch and sleeve-slot hereinbefore referred to.

The operation is as follows: The valve being open with pressure behind or to the left of the carriage, the latter, as shown in Fig. 8, is represented as traveling in the direction of the roller 22 and engages the point A of the cam 24ª, forcing the roller 22 down to point B, which operates the reversing mechanism and closes the valve. Then the carriage moves on in the same direction of its own momentum, the said roller going to the point C, Fig. 9, which operates said mechanism to open the valve with pressure ahead or to the right of the carriage. The latter moves to the left until the roller engages the point B, Fig. 10, which closes the valve, stops the carriage, and leaves it so. Thus the carriage is reversed and brought to a standstill without the aid of an operator or attendant. To start the carriage on its return, the hand-lever is operated to run the roller from its stopping-point B down to D, which opens the valve with pressure behind or to the right of the carriage. Both rollers 22 and 22ª having the same action, the roller 22ª is thus left in position, Fig. 11, to be engaged by the point E of the cam 24, whereupon the aforesaid operation is repeated.

Having thus described my invention, what I claim as new, and desire to secure by Letters Patent, is—

1. The carriage reversing mechanism comprising the rock shaft journaled parallel with the travel of the carriage and having a weighted lever upon each end, bars secured to the levers and adapted by a vertical movement to operate the shaft, a crank upon the shaft, and a valve having a stem connected to the crank, and controlled by said mechanism, combined with the reverser secured upon the carriage for operating the said reversing mechanism, as set forth.

2. The combination with a saw mill carriage, and the reverser secured thereto, of the reversing mechanism having bars movable vertically through the mill floor and provided with rollers to engage the reverser at each end of the carriage travel, and means for coupling and uncoupling the said reversing mechanism comprising the trigger, the valve stem, the connecting rod, the crank shaft engaging the trigger, and the foot lever connected to the crank shaft and projecting vertically through the mill floor, as set forth.

3. The combination with a saw mill carriage, and the carriage reversing mechanism, of the reversers secured to the carriage, the same comprising a track formed by top and bottom flanges, the latter being deflected to form a cam upon the outer end of the track, the vertically movable bars, and the rollers upon said bars adapted to engage the cams to operate the said reversing mechanism at each end of the carriage stroke, substantially as set forth.

4. The combination with the cams or reversers upon the carriage and the reversing mechanism, a slide valve the stem of which is provided with a sleeve, the notched connecting rod working in the sleeves, the crank shaft, and the trigger secured upon the sleeve and operated by the crank shaft to connect and disconnect the valve stem and connecting rod, as set forth.

5. The combination with the carriage, and the reversers secured thereto, the rock shaft journaled parallel with the travel of the carriage, the weighted levers secured to the shaft the bars connected to said levers and provided with rollers, the crank upon the shaft between the levers the steam valve and its connections to the crank, as set forth.

DE ELBERT PARMENTER HEATH.

Witnesses:
CHARLES SEIDLE,
DANFORTH A. CLARK.